United States Patent [19]

Takeda

[11] 4,358,462
[45] Nov. 9, 1982

[54] PROCESS OF BREWING AN ALCOHOLIC BEVERAGE FROM RICE

[75] Inventor: Masahisa Takeda, Komae, Japan

[73] Assignee: Ozeki Sake Brewing Co., Ltd., Hyogo, Japan

[21] Appl. No.: 151,369

[22] Filed: May 19, 1980

Related U.S. Application Data

[63] Continuation-in-part of Ser. No. 902,691, May 4, 1978, abandoned.

[30] Foreign Application Priority Data

Feb. 27, 1978 [JP] Japan ................................ 53-021917

[51] Int. Cl.$^3$ ........................ C12C 11/00; C12G 3/00
[52] U.S. Cl. ..................................... 426/13; 426/11; 426/15; 426/29; 426/16
[58] Field of Search ...................... 426/11, 13, 15, 16, 426/29

[56] References Cited

U.S. PATENT DOCUMENTS 3,988,204 10/1976 Andreasen et al. .............. 426/29 X

FOREIGN PATENT DOCUMENTS 51-7194 1/1976 Japan.
1248505 10/1971 United Kingdom.

OTHER PUBLICATIONS

Amerine, et al., The Technology of Wine Making 3rd Ed., The Avi Publishing Co., Inc. Westpont, Conn. 1972, (pp. 493, 494 & 533-538).

*Primary Examiner*—David M. Naff
*Attorney, Agent, or Firm*—Birch, Stewart, Kolasch and Birch

[57] ABSTRACT

An alcoholic beverage having improved taste and sweetness and a wine-like flavor is produced by steps of saccharifying steamed or cooked unpolished rice and/or reddish rcie with an enzyme composition containing a saccharifying enzyme substantially free of protease and producing by a microorganism selected from Rhizopus, Aspergillus, Endomyces, or *Bacillus substilis*, fermenting the resulting mash with yeast until a supernatant thereof reaches a certain degree of maturity and mixing the resultant matured mash with separately saccharified steamed or cooked rice or a saccharide to produce the beverage. A slurry of steamed or cooked rice may be added during yeast fermentation to simultaneously carry out fermentation and saccharification.

11 Claims, No Drawings

PROCESS OF BREWING AN ALCOHOLIC BEVERAGE FROM RICE

This application is a continuation-in-part of application Ser. No. 902,691 filed May 4, 1978, now abandoned.

The present invention relates to an improved process for brewing alcoholic beverages. More particularly, the alcoholic beverages of the present invention are made from a starch material such as unpolished or rough rice, a mixture of reddish rice bran and cleaned rice or the like and have a higher alkalinity (i.e. so-called alkaline liquors) and wine-like flavor.

In sake (Japanese sake) brewing, recently, various processes have been intensively studied to develop various types of sake so as to suit all consumers' tastes and to extend the market thereof. On the other hand, it is said that unpolished rice is better than cleaned or polished rice for health, and foods made from unpolished rice are often recommended to improve human health. Then, it is proposed to use unpolished rice as a starch material in sake brewing.

Generally, sake is made from highly cleaned rice such as less than 75% cleaning yield-cleaned rice. The cleaned rice is washed, immersed in water, steamed or cooked and admixed with a rice koji [Rice koji contains many kinds of enzymes, especially saccharifying enzymes, and performs the same function as a malt does in the beer and whisky production. Rice koji is prepared by inoculating the spores of the mold (*Aspergillus oryzae*) into steamed rice and cultivating the inoculated rice.], a seed mash of sake yeast and brewers' water to give a sake mash. The sake mash is saccharified with the rice koji while it is fermented with the seed mash by maintaining at a suitable temperature for an appropriate period of time. The resulting matured mash is then filtered to remove grains. The filtrate thus obtained is refined by a further filtration and pasteurized to give the desired product.

However, when using unpolished rice or rice bran such as so-called reddish rice bran or yellowish rice bran, or even if using more than 90% cleaning yield-cleaned rice as a starch material in sake brewing, sake having a good quality is not produced, but rather a sake having browning, some odd tastes and poor flavor is obtained. Therefore, it is difficult to produce a sake of good quality using unpolished rice or rice bran as a starch material.

In Japanese Patent Publication (unexamined) No. 7194/1976 (Japanese Patent Application No. 31755/1974), the present inventor disclosed generically that an alcoholic beverage of good quality, which somewhat differs from a conventional sake since it has higher alkalinity and wine-like flavor, is obtained by saccharifying a steamed starch material such as unpolished rice, rice bran or a mixture thereof with an enzyme composition at an elevated temperature, cooling the resulting saccharified slurry or mash, and then fermenting the slurry or mash with a yeast culture.

However, in the process of the above Japanese Patent Publication, a severe control of the fermentation is needed and it is difficult to constantly obtain an alcoholic beverage of good quality having improved taste, sweetness and wine-like flavor.

It has been newly found that the above type of liquor which has more improved properties can be readily and constantly produced by using a specific starch material and a specific enzyme composition under specific conditions.

One object of the present invention is to provide an improved process for brewing alcoholic beverages from a starch material such as unpolished rice, rice bran or a mixture thereof. Another object of the present invention is to provide an improved process for brewing alcoholic beverages having a higher alkalinity and wine-like flavor. Still another object of the present invention is to provide novel alcoholic beverages having a higher alkalinity, wine-like flavor and more improved properties. These and other objects of the present invention will become apparent from the following description.

The term "cleaning yield" used herein means a cleaning or refining rate of rice and is calculated as follows:

$$\text{Cleaning yield (\%)} = \frac{\text{Weight of cleaned rice obtained}}{\text{Weight of unpolished rice used in the rice cleaning}} \times 100.$$

The term "reddish rice bran" used herein means a rice bran obtained during a cleaning step from unpolished rice to provide more than 90% cleaning yield-cleaned rice.

The term "yellowish rice bran" used herein means a rice bran obtained during a cleaning step from 90% cleaning yield-cleaned rice to provide 80% cleaning yield-cleaned rice.

Similarly, the term "white rice bran" used herein means a rice bran obtained during a cleaning step from 80% cleaning yield-cleaned rice to provide 70% cleaning yield-cleaned rice.

The foregoing objects and others are generally accomplished in accordance with the present invention by providing an improved process for brewing an alcoholic beverage wherein a steamed or cooked starch material, selected from the group consisting of unpolished rice; a mixture of unpolished rice and cleaned rice of any cleaning yield; and a mixture of reddish rice bran and a member selected from unpolished rice, cleaned rice of any cleaning yield, yellowish rice bran, white rice bran and a mixture thereof (preferably containing 10 to 20% by weight of reddish rice bran on the basis of the total weight of the mixture), is saccharified with an enzyme composition which contains a saccharifying enzyme having a saccharifying activity of $1 \times 10^5$ to $3 \times 10^5$ units/g of the composition and which is produced by a microorganism selected from the group consisting of Rhizopus, Aspergillus, Endomyces and *Bacillus subtilis* substantially free from any protease and without the addition of any protease at a temperature of 50° to 55° C. at a pH of 4.5 to 6.0 to give a slurry or mash. The slurry or mash is fermented with a yeast culture at 10° to 30° C. at a pH of 3.5 to 4.0 until the supernatant liquid thereof reaches to a certain degree of maturity. The resulting matured slurry or mash is mixed with another portion of the above steamed or cooked starch material separately saccharified with the above enzyme composition to adjust sugar content in the mixture and then, the mixture is filtered to remove grains. The filtrate thus obtained is further refined and pasteurized to give the desired product.

In the present invention, there can be used inexpensive starch material such as unpolished rice, reddish rice bran or the like. Further, preparation of a rice koji and a seed mash of yeast which are complicated but necessary in sake brewing may be omitted in the process of the present invention because of using an enzyme composition and a yeast culture. Moreover, an alcoholic beverage having a higher alkalinity and wine-like flavor can be readily and constantly produced by the process of the present invention. The contents of amino acid and total nitrogen of the alcoholic beverage of the present invention are lower than those of sake. It contains a larger amount of vitamin and ash than those of sake. The ratio of phosphoric acid present in the ash of the alcoholic beverage of the present invention is remarkably lowered to a value such as 3.4 to 6.4% in the ash (in case of sake, 11.5 to 42.9%) and thereby the alkalinity of the liquor becomes higher. Accordingly, the alcoholic beverage of the present invention is a so-called alkaline liquor such as wine, whereas sake is a so-called acidic liquor. The wine-like flavor of the alcoholic beverage of the present invention is spontaneously produced after filtration of a matured mash and there is no change of quality of the liquor during storage, bottling or the like. Although components of the flavor and mechanism of production thereof are not clear, it is presumed that this wine-like flavor is derived from unpolished rice and/or reddish rice bran since the flavor is not produced when using highly cleaned rice as in sake brewing.

In the brewing process of the present invention, the starting starch material is previously steamed before being subjected to saccharification and fermentation. That is, unpolished rice and other rice materials are washed with water, immersed in water, drained or hydro-extracted and then steamed. When rice bran is used, it is steamed after scattering thereon a small amount of water. The thus steamed starch materials are added to brewers' water together with a saccharifying enzyme composition and thereto is added yeast culture and optionally an organic acid, and the mixture, which is in the form of a slurry or mash, is subjected to saccharification and fermentation. The saccharification and fermentation may be carried out simultaneously or sequentially.

That is, in one embodiment, the most part of the steamed starch material is added to brewers' water together with the most part of the saccharifying enzyme composition. The mixture is subjected to saccharification and optionally added thereto an organic acid after the saccharification. The saccharified slurry or mash is fermented with a yeast culture. Then, the resulting matured slurry or mash is mixed with the remaining steamed starch material separately saccharified with the remaining enzyme composition (this process is, hereinafter, referred to as "sequence-process").

In another embodiment, a part of the steamed starch material is added to brewers' water together with a part of the saccharifying enzyme composition to saccharify the starch material. The resulting slurry or mash is admixed with a yeast culture and optionally an organic acid to give a formulation (hereinafter, referred to as "1st formulation"). During the fermentation of 1st formulation, another formulation (2nd formulation), which is separately prepared from the most part of the remaining steamed starch material and optionally a part of the remaining enzyme composition, is added to the fermentation system, so that the saccharification and fermentation of the starch material of the latter formulation(s) are simultaneously effected. The 2nd formulation may be added at one time or dividedly. For example, a part of the 2nd formulation is added to the fermentation system, and after the saccharification and fermentation are proceeded for some extent, the remaining part of the 2nd formulation is added. Then, the resulting matured slurry or mash is mixed with the remaining steamed starch material separately saccharified with the remaining enzyme composition (3rd formulation) (this process is, hereinafter, referred to as "simultaneous-process"). In view of the fermentation ability of a yeast culture, the latter simultaneous-process is preferable.

In the above processes, the amount of the components in the slurry or mash is not critical and can be varied according to the desired product. However, it is preferable to use, in all, 130 to 170 parts by weight of brewers' water per 100 parts by weight of the steamed starch material in both the sequence-process and sumultaneous-process. Preferably, 0.4 to 1.3 parts by weight of an organic acid such as lactic acid per 100 parts by weight of the steamed starch material is added to the mash in order to accelerate the growth and activity of a yeast culture.

As the starch material of the present invention, unpolished rice can be used alone. Further, a mixture of unpolished rice and cleaned rice of any cleaning yield or a mixture of reddish rice bran and one or more other rice materials such as unpolished rice, cleaned rice of any cleaning yield, yellowish rice bran, white rice bran or the like can be also used. Particularly, it is preferable to use a mixture of 10 to 20 parts by weight of more than 90% cleaning yield-cleaned rice and 90 to 80 parts by weight of unpolished rice or a mixture of 10 to 20 parts by weight of reddish rice bran and 90 to 80 parts by weight of each one or a mixture of unpolished rice, more than 90% cleaning yield-cleaned rice and 80% cleaning yield-cleaned rice (i.e. a mixture of 80 to 90 parts by weight of unpolished rice and 20 to 10 parts by weight of reddish rice bran, a mixture of 80 to 90 parts by weight of more than 90% cleaning yield-cleaned rice and 20 to 10 parts by weight of reddish rice bran, a mixture of 80 to 90 parts by weight of 80% cleaning yield-cleaned rice and 20 to 10 parts by weight of reddish rice bran, or a mixture of 80 to 90 parts by weight of a mixture of two or three of unpolished rice, more than 90% cleaning yield-cleaned rice and 80% cleaning yield-cleaned rice and 20 to 10 parts by weight of reddish rice bran), since an alcoholic beverage having more improved quality can be made from these materials. When unpolished rice is used, preferably, it is previously rolled, milled, cracked or scratched or subjected to another similar treatment if unpolished rice is too hard to be utilized and its utilization is lowered.

The conditions for immersion and steaming or cooking of the starch material of the present invention may be the same as those of the sake brewing process. Usually, the starch material is immersed in water at a temperature of from 5° to 20° C. for 10 to 24 hours and steamed under a pressure of from normal pressure to 1.5 kg/cm$^2$ for 25 minutes to 2.5 hours. Bran is steamed alone or together with rice to be used after scattering thereon 0.3 to 0.5 part by weight of water per one part by weight of the bran.

After completion of steaming or cooking, the material is admixed with a predetermined amount of brewers' water and saccharified with a saccharifying enzyme composition without the addition of any protease.

As the enzyme composition, there can be used any commercially available composition containing a saccharifying enzyme produced by a microorganism such as Rhizopus, Aspergillus, Endomyces, *Bacillus subtilis* or the like, which is substantially free from protease.

The examples of the commercially available compositions are Gluc S and SB (trade names of the enzyme compositions produced and sold by Amano Seiyaku K.K.), Uniase K and S (trade names of the compositions produced and sold by Kinki Yakult K.K.), Sumizyme S and Panlase (trade names of the enzyme compositions produced and sold by Shin-Nippon Kagaku K.K.), Spitase MK (trade name of the composition produced and sold by Nagase Sangyo K.K.), Matsulase (trade name of the composition produced and sold by Matsutani Kagaku K.K.) or the like.

The saccharification of the slurry or mash of the present invention (in case of simultaneous-process, that of 1st formulation) is preferably carried out by addition of the steamed material to brewers' water which is previously warmed to the optimum temperature for saccharification and therein is suspended or dissolved the enzyme composition. Usually, the saccharification is carried out at 50° to 65° C., preferably 50° to 55° C., for 8 to 24 hours, preferably 8 to 15 hours. Preferably, the saccharification is carried out at a pH of 4.5 to 6.0. The amount of the enzyme composition to be used can be varied according to the activities thereof. Usually, 0.3 to 0.6 part by weight, preferably 0.4 to 0.5 part by weight, of the composition (saccharifying activity $=1\times 10^5$ to $3\times 10^5$ units/g composition) is used per 100 parts by weight of the steamed starch material. If desired, a small amount of rice koji, for example, 11 to 20 parts by weight of rice koji per 100 parts by weight of the steamed starch material may be used together with the enzyme composition.

A saccharification test was carried out by using several commercially available enzyme compositions as follows:

A mixture of 75% cleaning yield-cleaned rice (90 parts), reddish rice bran (5 parts) and yellowish rice bran (5 parts) was added to brewers' water (150 parts) containing one of the enzyme compositions (0.4 part) listed in the following Table 1. The slurry thus obtained was saccharified at 55° C. for 15 hours (pH: 5.0) and the Baumé degree, sugar content and acidity of the saccharified slurry were determined. The results are shown in Table 1.

The latter is not preferable in veiw of utilization of the material and quality of the alcoholic beverage obtained.

After completion of the saccharification (in case of simultaneous-process, that of 1st formulation), the saccharified slurry or mash is cooled to about 30° C. A suitable amount of yeast culture and, if desired, lactic acid as mentioned above are added to the slurry and alcoholic fermentation is carried out.

In the present invention, any yeast strain which is usually used in sake or wine brewing can be used. It is preferable to use a yeast strain which grows well in a mash at about 20° C. under acidic condition such as pH 3.5 to 4.0. Wine yeast is more preferable. Examples of yeast strains are those *Saccharomyces cerevisiae* strains such as Kyokai No. 7 sake yeast and OC-No. 2 wine yeast strains [both of them are sold by Nippon Jozo Kyokai (Japanese Brewers' Association)], IFO 2220, IFO 2300, IFO 2218, IFO 2249, IFO 2252, IFO 2315 or the like. Among them, Kyokai No. 7, OC-No. 2, IFO 2220 and IFO 2300 strain are preferable. A yeast culture to be added to a mash can be prepared by a method known to the prior art.

The fermentation is usually carried out at 10° to 30° C., preferably 20° to 25° C., for 15 to 20 days until a supernatant liquid of the mash having 0 to +25 of sake-meter [One representation of specific gravity measured at 15° C. by a gravimeter having a scale corresponding to 1/10 as much as Baumé degree, that is, sake-meter 0=Baumé degree 0 and sake-meter 1=Baumé degree 0.1. Minus (−) means that the specific gravity is heavier than sake-meter 0 and plus (+) means that the specific gravity is lighter than sake-meter 0.], 0.55 to 0.8% of acidity (as lactic acid), 13 to 17.5% of alcohol and 0.2 to 0.6% of sugar is obtained in both the sequence-process and simultaneous-process. The amount of a yeast culture to be added will be apparent to those skilled in the art. The progress of the fermentation can be monitored by collecting samples from the mash and determining their components and properties.

When the desired maturity of the mash is attained, the mash is further mixed with a saccharified slurry or mash of another portion of the steamed starch material to adjust sugar content in the matured mash and thereby to

TABLE 1

| Enzyme Composition | Manufacturer | Baume Degree | Sugar Content (%) Reducing Sugar | Total Sugar | Acidity (ml) | Amino Acidity (ml) |
|---|---|---|---|---|---|---|
| Gluc S* | Amano Seiyaku K.K. | 11.9 | 21.4 | 23.3 | 0.05 | 0.10 |
| Gluc SB* | " | 12.1 | 21.9 | 29.9 | 0.30 | 0.25 |
| Uniase K* | Kinki Yakult K.K. | 11.5 | 20.9 | 28.9 | 0.20 | 0.10 |
| Uniase S* | " | 11.6 | 20.5 | 28.5 | 0.25 | 0.15 |
| Uniase A** | " | 6.3 | 8.65 | 24.5 | 0.25 | 0.10 |
| Smizyme S* | Shin-Nippon Kagaku K.K. | 11.9 | 21.4 | 23.3 | 0.05 | 0.20 |
| Panlase* | " | 11.6 | 22.1 | 24.3 | 0.10 | 0.25 |
| Spitase M** | Nagase Sangyo K.K. | 12.0 | 9.63 | 22.8 | 0.20 | 0.10 |
| Spitase MK* | " | 9.4 | 20.5 | 28.8 | 0.20 | 0.10 |
| Kokugen** | Daiwa Kasei K.K. | 8.3 | 12.9 | 28.1 | 0.05 | 0.05 |
| Matsulase* | Matsutani Kagaku K.K. | 10.9 | 22.0 | 29.4 | 0.20 | 0.20 |

[Note]
*:a saccharifying enzyme composition
**:a liquefying enzyme composition
Acidity is the titer (ml) of N/10 NaOH (sample 10 ml).
Amino Acidity is the titer (ml) of N/10 NaOH (sample 10 ml) according to formol titration method.

As shown in Table 1, when a saccharifying enzyme composition is used, the accumulation of reducing sugar is sufficient and a sufficient amount of alcohol is produced by alcoholic fermentation with yeast. However, when a liquefying enzyme composition is used, the accumulation of reducing sugar is insufficient and, therefore, the production of alcohol is also insufficient.

improve taste, sweetness and balance of flavor of the alcoholic beverage. The saccharified slurry or mash is prepared by separately saccharifying the starch material corresponding to 5 to 20% of that used in the above procedure with the above enzyme composition at 50° to 55° C. for 8 to 24 hours. After mixing, the mixture is immediately enclosed with a filter cloth and pressed to remove grains.

and beer. The results are shown in the following Table 2.

TABLE 2

| Liquors | | Alcohol (%) | pH | Acidity (ml) | Amino Acidity (ml) | Total Nitrogen (%) | Sugar (%) | Vitamins (r/L) | |
|---|---|---|---|---|---|---|---|---|---|
| | | | | | | | | $B_1$ | $B_2$ |
| The Present Invention | I  II  III | 12–13 | 3.8–3.9 | 5–6 | 0.2–0.3 | 0.025–0.03 | 3–5 | 440 | 41 |
| Wine | White  Red | 12–13 | 3.1–3.3 | 6–8 | 0.15–0.3 | 0.025–0.04 | 0.7–0.9 | 10–58 | 90–130 |
| Sake | Special Class  1st Class  2nd Class | 15–18 | 4.2–4.4 | 1.2–1.7 | 1.2–1.8 | 0.08–0.1 | 2–5 | 32 | 8 |
| Beer | | 3.5–4.0 | 4.2–4.5 | 1.4–2.0 | 0.3–1.2 | 0.45–0.48 | 3.6–5.3 | 24–62 | 315–340 |

[Note]:
Vitamin $B_1$ is determined by oxidation with BrCN according to Thiochrome Assay.
Vitamin $B_2$ is determined by Lumiflavin Assay.
Acidity and Amino Acidity are shown in the same manner in Table 1.

| Liquors | | Alkalinity | Ash (%) | Inorganic Ingredients (ppm) | | | | | |
|---|---|---|---|---|---|---|---|---|---|
| | | | | P | Mg | K | Na | Ca | Fe |
| The present Invention | I | +8.0 | 0.299 | 102.3 | 422.0 | 758.0 | 38.0 | 33.6 | 1.55 |
| | II | +10.6 | 0.258 | 145.2 | 506.0 | 810.0 | 34.3 | 36.1 | 1.55 |
| | III | +13.6 | 0.260 | 116.4 | 278.0 | 458.0 | 30.0 | 21.0 | 1.03 |
| Wine | White | +6.6 | 0.161 | 102.3 | 110.0 | 340.0 | 16.0 | 70.5 | 2.88 |
| | Red | +11.0 | 0.235 | 148.5 | 108.5 | 616.0 | 26.0 | 65.0 | 3.95 |
| Sake | Special Class | −15.4 | 0.028 | 37.9 | 5.3 | 25.8 | 12.5 | 26.4 | 0.09 |
| | 1st Class | −14.0 | 0.020 | 71.4 | 3.6 | 33.0 | 32.0 | 10.0 | 0.19 |
| | 2nd Class | −15.3 | 0.020 | 85.7 | 7.0 | 30.0 | 30.0 | 12.6 | 0.23 |
| Beer | | −5.0 | 0.111 | 128.7 | 90.0 | 385.0 | 27.9 | 16.5 | 0.23 |

[Note]:
Alkalinity is determined according to the method described by Ohotsuka et al [J. Soc. Brew. Japan, 71(6), 476–479 (1976)].

It has been newly found that an alcoholic beverage having 3 to 5% of reducing sugar and having improved taste, sweetness and wine-like flavor can be readily and constantly obtained by previously fermenting the most of starch material used and then mixing the saccharified, but not fermented remaining starch material after the fermentation, though, in the afore-mentioned Japanese Patent Publication (unexamined) No. 7194/1976, it is difficult to constantly obtain such the alcoholic beverage since whole of the steamed starch material is fermented at one time and, therefore, control of the fermentation is very difficult and fermentation ability of a yeast culture is insufficient.

Further, it has been also found that a saccharide such as glucose, sucrose, fructose, maltose, corn sugar, sorbitol, manitol, maltitol, xylite, cyclodextrin, dextrin, corn syrup or a mixture thereof can be substituted for a saccharified mash to be added to a matured mash to adjust sugar content. The saccharide is dissolved in water and admixed with a mature mash to adjust sweetness suitably. Then, the mixture is immediately enclosed with a filter cloth and pressed to remove grains.

The above prepared filtrate is further refined by filtration, pasteurized at 50° to 65° C. and matured by storage. On storage for 2 to 3 months at room temperature, a wine-like flavor is produced. This product or a diluent thereof with water in the desired alcohol content, for example, 12 to 13% is then pasteurized at 50° to 60° C. for 5 to 30 minutes and bottled while it is hot according to a method known to the prior art to give the alcoholic beverage of the present invention.

The quality of the alcoholic beverage of the present invention (using unpolished rice alone in the sequence-process) was estimated in comparison with sake, wine and beer. The results are shown in the following Table 2.

As shown in Table 2, the amino acid content and the total nitrogen content of the alcoholic beverages of the present invention are lower than those of sake. They contain a larger amount of vitamin and ash than those of sake. Further the ratio of phosphoric acid presented in ash of the alcoholic beverages of the present invention is remarkably lowered. It is believed that the lower ratio of phosphoric acid results from the difference between the activities of a saccharifying enzyme composition used in the present invention and a rice koji used in sake brewing on extraction of phytin-like phosphorus from a starch material. The alcoholic beverages of the present invention are characterized by this phosphorus ratio as well as the high content of ash and the high alkalinity thereof.

The following examples illustrate the present invention but are not to be construed as limiting the scope thereof.

EXAMPLE 1

Preparation Formula (sequence-process)

| Ingredients | Parts by weight |
|---|---|
| Steamed rice (unpolished rice) | 85 |
| Enzyme composition (Gluc SB) | 0.026 |
| Water | 130 |
| Lactic acid (75%) | 0.65 |
| Yeast culture (IFO 2300 strain) | q.p. |

The unpolished rice was washed and immersed in water at 13° C. for about 15 hours. After draining water from the immersed rice, it was steamed for 1.5 hours under the pressure of 0.04 kg/cm². According to the above formula, water was warmed to 40° to 50° C., the enzyme composition was dissolved therein and then the above prepared steamed rice was added thereto while the temperature was maintained at about 55° C. This temperature was maintained for 15 hours to saccharify the slurry and then it was cooled to 25° C. The analysis of the slurry thus obtained showed Baumé 12.5, acidity 0.32 (as lactic acid), reducing sugar 13.5% and pH 3.92.

After addition of lactic acid and the yeast culture, the mash was fermented at 20° to 25° C. for about 20 days. A sample of supernatant liquid of the mash was collected and the maturity thereof was determined. After 20 days, fermentation was completed and sake-meter of the matured mash reached to +15.

According to the formulation of saccharified mash below, a saccharified mash was prepared by saccharifying the steamed rice at 55° C. for 15 hours. The saccharified mash was mixed with the above prepared matured mash and the mixture was put into a filter cloth and pressed to remove grains.

Formulation of saccharified mash

| Ingredients | Parts by weight |
|---|---|
| Steamed rice (unpolished rice) | 15 |
| Enzyme composition (Gluc SB) | 0.006 |
| Water | 23 |

EXAMPLE 2

Preparation Formula (sequence-process)

| Ingredients | Parts by weight |
|---|---|
| Steamed rice | |
| (90% cleaning yield-cleaned rice) | 75 |
| Reddish rice bran | 10 |
| Enzyme composition (Matsulase) | 0.026 |
| Water | 130 |
| Lactic acid (75%) | 0.65 |
| Yeast culture (OC-No. 2 strain) | q.p. |

The cleaned rice was washed, immersed in water at 13° C. for about 15 hours and then drained. After scattering 20 to 30% by weight of water on the basis of the total weight of the reddish rice bran, the reddish rice bran was laid on the rice and they were steamed for 1 hour under the pressure of 1 kg/cm². According to the above formula, water was warmed to 40° to 50° C., the enzyme composition was dissolved therein and then the above prepared steamed material was added thereto. The slurry thus obtained was saccharified at the same temperature for 15 hours. After cooling to 25° C., lactic acid and the yeast culture were added to the saccharified mash. The mash was fermented to 20° to 25° C. for 20 days. After 20 days, fermentation was completed and sake-meter of the matured mash reached to +17.

According to the formulation of saccharified mash below, a saccharified mash was prepared by saccharifying the steamed rice at 55° C. for 15 hours. The saccharified mash was mixed with the above prepared matured mash and the mixture was put into a filter cloth and pressed to remove grains.

Formulation of saccharified mash

| Ingredients | Parts by weight |
|---|---|
| Steamed rice | 15 |
| (90% cleaning yield-cleaned rice) | |
| Enzyme composition (Matsulase) | 0.006 |
| Water | 23 |

EXAMPLE 3

Preparation Formula (simultaneous-process)

| | Parts by weight |
|---|---|
| Ingredients of 1st formulation | |
| Steamed rice (unpolished rice) | 90 |
| Water | 150 (+40 for cooling) |
| Enzyme composition (Gluc SB) | 0.036 |
| Lactic acid (75%) | 1.16 |
| Yeast culture (Kyokai No. 7 strain) | q.p. |
| Ingredients of 2nd formulation | |
| Steamed rice (unpolished rice) | 80 |
| Water | 48 |
| Enzyme composition (Gluc SB) | 0.032 |
| Lactic acid (75%) | 0.85 |
| Ingredients of 3rd formulation | |
| Steamed rice | 10 |
| (90% cleaning yield-cleaned rice) | |
| Rice koji | 20 |
| (90% cleaning yield-cleaned rice) | |
| Water | 36 |
| Enzyme composition (Gluc SB) | 0.012 |

Firstly, the unpolished rice of the 1st formulation was washed and immersed in water at 15° C. for 20 hours. After draining, the rice was steamed for 2 hours under the pressure of 0.04 kg/cm². According to the above 1st formulation, 150 parts by weight of water was warmed to 40° to 50° C., the enzyme composition was dissolved therein and then the above prepared steamed rice was added thereto. The slurry thus obtained was saccharified at about 55° C. for 15 hours and cooled to about 30° C. by addition of 40 parts by weight of water. Lactic acid and the yeast culture were added to the cooled slurry (Baumé degree 14.4, acidity 0.46 (as lactic acid), reducing sugar 13.6%, pH 4.0) and it was fermented at about 20° C.

After 24 hours, the 2nd formulation was added to the fermenting 1st formulation as follows:

The unpolished rice of the above 2nd formulation was treated by the same procedure in the 1st formulation, admixed with water, the enzyme composition and lactic acid and then cooled to about 20° C. This was added to the 1st formulation (Baumé degree 8.0, acidity 0.68 (as lactic acid), reducing sugar 6.68, pH 3.79) and the mixture was fermented at about 20° C. for about 20 days. A sample of supernatant liquid of the mash was collected and determined maturity thereof. When a desired maturity was attained, the above 3rd formulation (saccharified mash) was added thereto.

The rice koji of the 3rd formulation was prepared by admixing the steamed 90% cleaning yield-cleaned rice with 0.1 to 0.035% by weight of koji-mold spore on the basis of the weight of the rice and maintaining the temperature at 30° to 40° C. for 35 to 45 hours. The rice koji was admixed with the steamed cleaned rice, water and enzyme composition as in the 1st formulation and the mixture was saccharified at about 55° C. for 8 hours. After completion of the saccharification, it was cooled to about 30° C., and wholly admixed with the above prepared matured mash. The resulting mixture was then put into a filter cloth and pressed and remove grains.

EXAMPLE 4

Preparation Formula (simultaneous-process)

|  | Parts by weight |
|---|---|
| Ingredients of 1st formulation | |
| Steamed rice (unpolished rice) | 90 |
| Water | 150 (+40 for cooling) |
| Enzyme composition (Sumizyme S) | 0.036 |
| Lactic acid (75%) | 1.16 |
| Yeast culture (IFO 2300 strain) | q.p. |
| Ingredients of 2nd formulation | |
| Steamed rice (unpolished rice) | 80 |
| Water | 48 |
| Enzyme composition (Sumizyme S) | 0.032 |
| Lactic acid (75%) | 0.85 |
| Ingredients of 3rd formulation | |
| Steamed rice (unpolished rice) | 30 |
| Water | 36 |
| Enzyme composition (Sumizyme S) | 0.012 |

According to the same procedure as Example 3, the 2nd formulation was added to the 1st formulation and the mixture was fermented at about 20° C. for about 20 days to give a matured mash.

The 3rd formulation (saccharified mash) was saccharified at about 55° C. for 15 hours and cooled to about 30° C. The cooled slurry was admixed with the above prepared mash and pressed to remove grains.

EXAMPLE 5

Preparetion Formula (simultaneous-process)

|  | Parts by weight |
|---|---|
| Ingredients of 1st formulation | |
| Steamed rice (unpolished rice) | 90 |
| Water | 150 |
| Enzyme composition (Gluc SB) | 0.036 |
| Lactic acid (75%) | 1.16 |
| Yeast culture (IFO 2300 strain) | q.p. |
| Ingredients of 2nd formulation | |
| Steamed rice (unpolished rice) | 80 |
| Water | 48 |
| Enzyme composition (Gluc SB) | 0.032 |
| Lactic acid (75%) | 85 |

According to the same procedure as described in Example 3, the above 1st and 2nd formulations were saccharified and fermented to obtain a matured mash. The resulting mash was mixed with anhydrous crystalline glucose (15 parts by weight) dissolved in water (70 parts by weight). Then, the mixture was enclosed with a filter cloth and pressed to remove grains.

COMPARATIVE EXAMPLE 1

Preparation Formula

| Ingredients | Parts by weight |
|---|---|
| steamed rice (unpolished rice) | 100 |
| Enzyme composition (Gluc SB) | 0.04 |
| Water | 150 |
| Lactic acid (75%) | 1 |
| Yeast culture (IFO 2300 strain) | q.p. |

The unpolished rice was washed and immersed in water at 15° C. for 20 hours. After draining water from the immersed rice, it was steamed for 2 hours under the pressure of 0.04 kg/cm². According to the above formula, water was warmed to 40° to 50° C., the enzyme composition was dissolved therein and then the above prepared steamed rice was added thereto while the temperature was maintained at about 55° C. This temperature was maintained for 15 hours to saccharify the slurry and then it was cooled to about 30° C. After addition of lactic acid and the yeast culture, the mash was fermented at about 15° to 25° C. for about 20 days, A sample of supernatant liquid of the mash was collected and the maturity thereof was determined. When a desired maturity was attained, the mash was put into a filter cloth and pressed to remove grains.

COMPARATIVE EXAMPLE 2

Preparation Formula

| Ingredients | Parts by weight |
|---|---|
| Steamed rice (90% cleaning yield-cleaned rice) | 90 |
| Reddish rice bran | 10 |
| Enzyme composition (Uniase K) | 0.04 |
| Water | 150 |
| Lactic acid (75%) | 1 |
| Yeast culture (OC-No. 2 strain) | q.p. |

The cleaned rice was washed, immersed in water at 13° C. for 15 hours and then drained. After scattering 25 to 30% by weight of water on the basis of the total weight of the reddish rice bran, the reddish rice bran was laid on the rice and they were steamed for 1 hour under the pressure of 1 kg/cm². According to the above formula, water was warmed to 40° to 50° C., the enzyme composition was dissolved therein and then the above prepared steamed material was added thereto. The slurry thus obtained was saccharified at about 55° C. for 8 hours. After cooling to about 30° C., lactic acid and the yeast culture were added to the saccharified mash. The mash was fermented at about 15° to 25° C. for about 20 days. A sample of supernatant liquid of the mash was collected and the maturity thereof was determined. When a desired maturity was attained, the mash was put into a filter cloth and pressed to remove grains.

In the following Table 3, there is shown the analytical data of the products of Examples 1 to 5 and Comparative Examples 1 and 2.

TABLE 3

| Example No. | Alcohol (%) | Sakemeter | Acidity (as lactic acid) | Amino acidity (ml) | Reducing Sugar (%) | pH | Alkalinity |
|---|---|---|---|---|---|---|---|
| 1 | 15.2 | −15.0 | 0.60 | 0.35 | 4.05 | 4.05 | +20.0 |
| 2 | 14.2 | −18.0 | 0.58 | 0.30 | 4.20 | 4.10 | +22.0 |
| 3 | 15.0 | −25.0 | 0.57 | 0.30 | 4.60 | 3.93 | +20.2 |
| 4 | 15.5 | −22.0 | 0.59 | 0.35 | 4.45 | 3.90 | +24.9 |
| 5 | 13.5 | −12.0 | 0.56 | 0.25 | 4.50 | 4.05 | +20.0 |
| Comparative | | | | | | | |
| 1 | 17.5 | −5.0 | 0.54 | 0.30 | 2.50 | 3.75 | +23.5 |
| 2 | 17.0 | −7.5 | 0.56 | 0.40 | 3.00 | 3.60 | +23.3 |

[Note]:
Amino Acidity is the same as in Table 1.

As shown in Table 3, the alcoholic beverages of the present invention have improved taste, sweetness and wine-like flavor due to mixing of the saccharified mash with the matured mash after the fermentation, whereas the alcoholic beverages prepared without mixing of any saccharified mash after fermentation (Comparative Examples 1 and 2) have inferior taste and flavor since sake-meter and sugar content thereof are low, and alcohol content is high.

What is claimed is:
1. A process for brewing a sake comprising:
   (a) saccharifying a first amount of a steamed or cooked rice material with an enzyme composition at from 50° to 55° C. at a pH of from 4.5 to 6.0 without addition of any protease to produce a first saccharified slurry or mash wherein said rice material is a member selected from the group consisting of (1) an unpolished rice (2) a mixture of an unpolished rice and a cleaned rice of any cleaning yield, and (3) a mixture of a reddish bran and a member selected from the group consisting of an unpolished rice, cleaned rice of any cleaning yield, yellowish rice bran, white rice bran and a mixture thereof;
   (b) said enzyme composition of step (a) being substantially free from any protease and containing a saccharifying enzyme having a saccharifying activity of from $1 \times 10^5$ to $3 \times 10^5$ units/g of the composition and which is produced by a microorganism selected from the group consisting of Rhizopus, Aspergillus, Endomyces, and *Bacillus subtilis*;
   (c) fermenting said first saccharified slurry or mash with a yeast culture at from 10° to 30° C. at a pH of 3.5 to 4.0 until a supernatent liquid of said slurry or mash having a 0 to +25 sake meter, 13 to 17.5% alcohol content and 0.2 to 0.6% sugar content is obtained to produce a matured mash;
   (d) separately, saccharifying a second amount of steamed or cooked rice material with an enzyme composition at from 50° to 55° C. for 8 to 24 hours to produce a second saccharified mash, wherein said rice material is the same as that used in step (a), said second amount of rice material is equal to approximately 5 to 20% by weight of said first amount used in step (a) and said enzyme composition is the same as that used in step (a);
   (e) mixing said second saccharified mash of step (d) with said matured mash of step (c); and
   (f) removing grains from the resulting mixture of step (e) to produce said sake.
2. The process of claim 1, wherein the fermentation is carried out in the presence of an organic acid.
3. The process of claim 2, wherein the organic acid is lactic acid.
4. A process for brewing a sake comprising:
   (a) saccharifying a first amount of a steamed or cooked rice material with an enzyme composition at from 50° to 55° C. at a pH of from 4.5 to 6.0 without addition of any protease to produce a first saccharified slurry or mash wherein said rice material is a member selected from the group consisting of (1) an unpolished rice (2) a mixture of an unpolished rice and a cleaned rice of any cleaning yield, and (3) a mixture of a reddish rice bran and a member selected from the group consisting of an unpolished rice, cleaned rice of any cleaning yield, yellowish rice bran, white rice bran and a mixture thereof;
   (b) said enzyme composition of step (a) being substantially free from any protease and containing a saccharifying enzyme having a saccharifying activity of from $1 \times 10^5$ to $3 \times 10^5$ units/g of the composition and which is produced by a microorganism selected from the group consisting of Rhizopis, Aspergillus, Endomyces and *Basillus subtilis*;
   (c) fermenting said first saccharified slurry or mash with a yeast culture at from 10° to 30° C. at a pH 3.5 to 4.0;
   (d) adding a second formulation slurry comprising a second amount of said steamed or cooked rice material in total or in portions to said first saccharified slurry or mash during the fermentation of step (c) to simultaneously carry out fermentation and saccharification of the resulting mixture of said slurries until a supernatent liquid of the mixture having a 0 to +25 sake meter, a 0.55 to 0.8% acidity as lactic acid, a 13 to 17.5% alcohol content and a 0.2 to 0.6% sugar content is obtained to produce a matured mash;
   (e) separately, saccharifying a third amount of steamed or cooked rice material with an enzyme composition at from 50° to 55° C. for from 8 to 24 hours to produce a saccharified mash, wherein said rice material is equal to approximately 5 to 20% by weight of said first amount used in step (a) and said enzyme composition is the same as that used in step (a);
   (f) mixing said saccharified mash of step (e) with said matured mash of step (d); and
   (g) removing grains from the resulting mixture of step (f) to produce said sake.
5. The process of claim 4, wherein said second formulation includes said enzyme composition.
6. The process of claim 4, wherein the fermentation is carried out in the presence of an organic acid.
7. The process of claim 6, wherein the organic acid is lactic acid.
8. A process for brewing a sake comprising:
   (a) saccharifying a first amount of a steamed or cooked rice material with an enzyme composition at from 50° to 55° C. at a pH of from 4.5 to 6.0 without addition of any protease to produce a first saccharified slurry or mash wherein said rice material is a member selected from the group consisting of (1) an unpolished rice (2) a mixture of an unpolished rice and a cleaned rice of any cleaning yield, and (3) a mixture of a reddish rice bran and a member selected from the group consisting of unpolished rice, cleaned rice of any cleaning yield, yellowish rice bran, white rice bran and a mixture thereof;
   (b) said enzyme composition of step (a) being substantially free from any protease and containing a saccharifying enzyme having a saccharifying activity of from $1 \times 10^5$ to $3 \times 10^5$ units/g of the composition and which is produced by a microorganism selected from the group consisting of Rhizopis, Aspergillus, Endomyces and *Basillus subtilis*;
   (c) fermenting said first saccharified slurry or mash with a yeast culture at from 10° to 30° C. at a pH 3.5 to 4.0;
   (d) adding a second formulation slurry comprising a second amount of said steamed or cooked rice material in total or in portions of said first saccharified slurry or mash during the fermentation of step (c) to simultaneously carry out fermentation and saccharification of the resulting mixture of said slurries until a supernatant liquid of the mixture having a 0 to +25 sake meter, a 0.55 to 0.8% acidity as lactic acid, a 13 to 17.5% alcohol content and a 0.2 to 0.6% sugar content is obtained to produce a matured mash;

(e) mixing a saccharide selected from the group consisting glucose, sucrose, fructose, maltose, corn sugar, sorbitol, manitol, xylite, cyclodextrin, dextrin, corn syrup and a mixture thereof to said matured mash of step (d); and (f) removing grains from the resulting mixture of step (e) to produce said sake.

9. The process of claim 8, wherein said second formulation includes said enzyme composition.

10. The process of claim 8, wherein the fermentation is carried out in the presence of an organic acid.

11. The process of claim 10, wherein the organic acid is lactic acid.

* * * * *